(12) United States Patent
Wang et al.

(10) Patent No.: US 12,464,243 B2
(45) Date of Patent: Nov. 4, 2025

(54) PHOTOGRAPHING METHOD FOR OBTAINING AN IMAGE BASED ON TWO CAMERAS, ELECTRONIC DEVICE AND NON-TRANSITORY COMPUTER-READABLE STORAGE MEDIUM

(71) Applicant: VIVO MOBILE COMMUNICATION CO., LTD., Guangdong (CN)

(72) Inventors: Jianhui Wang, Hangzhou (CN); Jianhua Yang, Hangzhou (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 122 days.

(21) Appl. No.: 18/388,653

(22) Filed: Nov. 10, 2023

(65) Prior Publication Data

US 2024/0080567 A1    Mar. 7, 2024

Related U.S. Application Data

(63) Continuation of application No. PCT/CN2022/092241, filed on May 11, 2022.

(30) Foreign Application Priority Data

May 11, 2021 (CN) .......................... 202110513615.4

(51) Int. Cl.
*H04N 23/695* (2023.01)
*H04N 23/63* (2023.01)
*H04N 23/90* (2023.01)

(52) U.S. Cl.
CPC ......... *H04N 23/695* (2023.01); *H04N 23/632* (2023.01); *H04N 23/90* (2023.01)

(58) Field of Classification Search
CPC ...... H04N 23/611; H04N 23/62; H04N 23/63; H04N 23/69; H04N 5/2628; G06V 10/225; G06V 10/75; G06V 20/41; G06V 40/172; G06V 40/161; G11B 27/031; G11B 27/34; G06F 2203/04806; G06F 3/04845
USPC ..................................................... 348/240.99
See application file for complete search history.

(56) References Cited

U.S. PATENT DOCUMENTS

| | | | |
|---|---|---|---|
| 7,193,645 B1 * | 3/2007 | Aagaard | H04N 5/2224 |
| | | | 348/E5.022 |
| 9,445,081 B1 * | 9/2016 | Kouperman | G06T 15/00 |
| 11,700,362 B2 * | 7/2023 | Hejl | G01B 11/24 |
| | | | 348/48 |
| 2003/0210329 A1 * | 11/2003 | Aagaard | H04N 17/002 |
| | | | 348/E7.086 |

(Continued)

FOREIGN PATENT DOCUMENTS

| CN | 106454121 A | 2/2017 |
|---|---|---|
| CN | 107592459 A | 1/2018 |

(Continued)

*Primary Examiner* — Usman A Khan
(74) *Attorney, Agent, or Firm* — The Webb Law Firm (57) ABSTRACT

A shooting method includes in a case that a first preview picture captured by a first camera is displayed, adjusting a target parameter of a second camera based on the first preview picture; capturing a first image through the first camera, and capturing a second image through a adjusted second camera; and obtaining a target image based on the first image and the second image. The target parameter includes at least one of following a shooting position or a focal length.

20 Claims, 5 Drawing Sheets

```
┌─────────────────────────────────────────────────┐
│ In a case that a first preview picture captured │
│ by a first camera is displayed, adjust a target │── 101
│ parameter of a second camera based on           │
│ the first preview picture                       │
└─────────────────────────────────────────────────┘
                         │
                         ▼
┌─────────────────────────────────────────────────┐
│ Capture a first image through the first camera, │── 102
│ and capture a second image through a            │
│ adjusted second camera                          │
└─────────────────────────────────────────────────┘
                         │
                         ▼
┌─────────────────────────────────────────────────┐
│ Obtain a target image based on the first image  │── 103
│ and the second image                            │
└─────────────────────────────────────────────────┘
```

(56) References Cited

U.S. PATENT DOCUMENTS

| | | | |
|---|---|---|---|
| 2009/0128647 A1 | 5/2009 | Fahn et al. | |
| 2010/0318467 A1* | 12/2010 | Porter | H04N 5/2624 348/207.1 |
| 2011/0157456 A1* | 6/2011 | Hongu | G03B 13/36 348/E5.045 |
| 2011/0255660 A1* | 10/2011 | Masuda | G01N 23/04 378/22 |
| 2012/0002958 A1* | 1/2012 | Muukki | G03B 17/12 396/325 |
| 2012/0044373 A1* | 2/2012 | Shiozaki | H04N 23/90 348/E5.045 |
| 2017/0163973 A1* | 6/2017 | Aagaard | H04N 23/62 |
| 2019/0208181 A1* | 7/2019 | Rowell | H04N 9/8205 |
| 2022/0174261 A1* | 6/2022 | Hornstein | G06N 20/00 |

FOREIGN PATENT DOCUMENTS

| | | |
|---|---|---|
| CN | 108200339 A | 6/2018 |
| CN | 108513069 A | 9/2018 |
| CN | 109040597 A | 12/2018 |
| CN | 110809115 A | 2/2020 |
| CN | 111683204 A | 9/2020 |
| CN | 113329172 A | 8/2021 |
| JP | H1169342 A | 3/1999 |
| JP | 2005204015 A | 7/2005 |
| JP | 2010010732 A | 1/2010 |

\* cited by examiner

PHOTOGRAPHING METHOD FOR OBTAINING AN IMAGE BASED ON TWO CAMERAS, ELECTRONIC DEVICE AND NON-TRANSITORY COMPUTER-READABLE STORAGE MEDIUM

CROSS-REFERENCE TO RELATED APPLICATIONS

This application is a Bypass Continuation application of International Patent Application No. PCT/CN2022/092241, filed May 11, 2022, and claims priority to Chinese Patent Application No. 202110513615.4, filed May 11, 2021, the disclosures of which are hereby incorporated herein by reference in their entireties.

BACKGROUND OF THE INVENTION

Field of the Invention

This application pertains to the image capture field, and in particular, relates to a shooting method, an electronic device and a non-transitory readable storage medium.

Description of Related Art

A photographing function in an electronic device is usually used to record daily life dynamics. To meet people's growing requirements for recording, shooting effects of electronic devices are getting better.

SUMMARY OF THE INVENTION

According to a first aspect, an embodiment of this application provides a shooting method. The method includes: in a case that a first preview picture captured by a first camera is displayed, adjusting a target parameter of a second camera based on the first preview picture, where the target parameter includes at least one of the following: a shooting position or a focal length; capturing a first image through the first camera, and capturing a second image through a adjusted second camera; and obtaining a target image based on the first image and the second image.

According to a second aspect, an embodiment of this application provides a shooting apparatus. The apparatus includes a display module, an adjustment module, a capture module, and a processing module. The display module is configured to display a first preview picture captured by a first camera. The adjustment module is configured to adjust a target parameter of a second camera based on the first preview picture in a case that the first preview picture captured by the first camera is displayed, where the target parameter includes at least one of the following: a shooting position or a focal length. The capture module is configured to capture a first image through the first camera, and capture a second image through a second camera adjusted by the adjustment module. The processing module is configured to obtain a target image based on the first image and the second image captured by the capture module.

According to a third aspect, an embodiment of this application provides an electronic device. The electronic device includes a processor, a memory, and a program or instructions stored in the memory and executable on the processor. When the program or instructions are executed by the processor, steps of the method according to the first aspect are implemented.

According to a fourth aspect, an embodiment of this application provides a non-transitory readable storage medium. The non-transitory readable storage medium stores a program or instructions. When the program or instructions are executed by a processor, steps of the method according to the first aspect are implemented.

According to a fifth aspect, an embodiment of this application provides a chip. The chip includes a processor and a communications interface. The communications interface is coupled to the processor. The processor is configured to run a program or instructions to implement the method according to the first aspect.

According to a sixth aspect, an embodiment of this application provides a computer program product. The program product is stored in a non-volatile storage medium. The program product is executed by at least one processor to implement the method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

A shooting method provided in the embodiments of this application are hereinafter described in detail by using embodiments and application scenarios thereof with reference to the accompanying drawings.

The shooting method provided in the embodiments of this application may be applied to a scenario in which an electronic device having a plurality of cameras takes photos.

Currently, most electronic devices (for example, mobile terminals) in the market are provided with two cameras: a front-facing camera and a rear-facing camera. The two cameras have clear roles and do not interfere with each other. Usually, the front-facing camera focuses more on close-ups (for example, portraits). The rear-facing camera has higher pixels and a wider viewing angle, and therefore is suitable for shooting distant scenes. Because scenarios to which the two cameras are applicable are different, in a case that the front-facing camera and the rear-facing camera are used to capture images of photographed objects, there are differences in terms of angle and size between an object in an image captured by the front-facing camera and an object in an image captured by the rear-facing camera. For example, in a case that a photographer uses the rear-facing camera of the electronic device to take a group portrait and uses the front-facing camera to take a picture of the photographer, in obtained photos, there are obvious differences between a direction of a line of sight and a portrait size corresponding to the group portrait and those corresponding to the photographer.

Therefore, shooting effects of the electronic device are poor, and the front-facing camera and the rear-facing camera cannot be used to bring better shooting experience to users, resulting in low shooting flexibility. The embodiments of this application are applied to an electronic device including a plurality of cameras. The cameras connected to the electronic device include a built-in camera integrated in the electronic device, and an external camera connected during use of the electronic device. It should be noted that camera types include but are not limited to a color camera, a black and white camera, an infrared camera, a moonlight camera, a starlight camera, and an ordinary camera.

For example, the plurality of cameras may include a front-facing camera, a rear-facing camera, an infrared camera, an under-display camera, and the like. Alternatively, the plurality of cameras may be other cameras available for the electronic device. This is not limited in the embodiments of this application.

Figure 1:
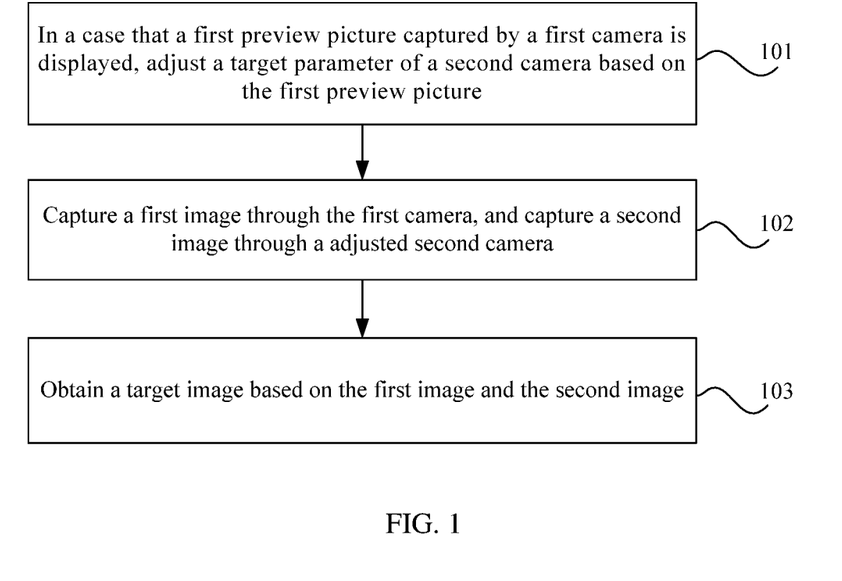
FIG. 1 is a schematic flowchart of a shooting method according to an embodiment of this application.

An embodiment of this application provides a shooting method. The shooting method may be applied to an electronic device. A flowchart of the shooting method provided in this embodiment of this application is shown in FIG. 1. As shown in FIG. 1, the shooting method provided in this embodiment of this application may include the following step 101 to step 103.

Step 101: In a case that a first preview picture captured by a first camera is displayed, adjust a target parameter of a second camera based on the first preview picture.

The target parameter includes at least one of the following: a shooting position or a focal length.

For example, the target parameter may include a shooting parameter of the second camera.

It should be noted that the shooting position may be a position in which the camera works, or when the camera is an under-display camera, the shooting position may be a screen position or region directly above a position in which the camera is located.

Optionally, in this embodiment of this application, the preview picture captured by the camera may be updated in real time, or may not be updated in a particular case. The preview picture may be set flexibly based on actual processing. This is not limited in this embodiment of this application.

Optionally, in this embodiment of this application, a shooting apparatus may adjust the target parameter of the second camera based on the first preview picture captured by the first camera in a multi-camera coordinated shooting mode. For example, the shooting apparatus may enter the multi-camera coordinated shooting mode by default after starting a camera application, or may enter the shooting mode after a user manually selects the shooting mode.

For example, when the first camera is a rear-facing camera and the second camera is a front-facing camera, the multi-camera coordinated mode may be a coordinated shooting mode between the front-facing camera and the rear-facing camera. That is, there is an adjustment function for photo compositing during shooting of the front-facing camera. Under a prerequisite that a viewfinder frame of the rear-facing camera is determined, the front-facing camera may be driven to make real-time adjustments based on a shooting situation of the front-facing camera, to ensure coordination between shooting angles of the front-facing camera and the rear-facing camera. For example, in a case that an angle of a person photographed by the rear-facing camera is an elevation angle, the position of the front-facing camera is adjusted, so that an angle of a person photographed by the front-facing camera is also an elevation angle. Therefore, after images taken by the rear-facing camera and the front-facing camera are composited, the angles of the persons keep consistent, so that a composited image is more natural.

In this embodiment of this application, the first camera may be a rear-facing camera or a front-facing camera in the electronic device.

In this embodiment of this application, the first camera may be a fixed camera or a movable camera. This is not limited in this embodiment of this application.

In this embodiment of this application, the first camera and the second camera may be under-display cameras.

It should be noted that the under-display camera in this embodiment of this application is a camera arranged under the screen of the electronic device, that is, the camera is hidden under the screen. For example, the camera is a movable under-display camera, that is, the camera is movable under the screen. In this case, the shooting apparatus can control the camera to move under the screen.

It may be understood that in this embodiment of the present application, hardware of the electronic device can support movement of the camera under the screen. Moreover, during the movement of the camera, the screen can support the electronic device in performing a normal display function and a touch control function.

For example, a screen position (denoted as a position 1) corresponding to the camera may be a screen position or region directly above the position in which the camera is located (denoted as a position 2). In this case, a screen position to which the position 2 is projected along a direction perpendicular to the screen (that is, the following first direction) at least partially overlaps the position 1, that is, a touch operation region of the user at least partially overlaps the position in which the camera is located.

Optionally, in this embodiment of this application, in a case that the camera supports the electronic device in performing the shooting function (that is, the camera is working), the screen position corresponding to the camera may be transparent to allow external light to enter a lens of the camera, and all other regions in the screen than this region are non-transparent. In this case, the normal display function and touch function can be performed in the other regions. For example, the electronic device can display, in the other regions in a preview manner, an image captured by the camera.

In this embodiment of this application, the shooting apparatus may display, in a preview region corresponding to the first camera, the first preview picture captured by the first camera.

Optionally, in this embodiment of this application, in a case that a plurality of cameras are running, a shooting interface of the shooting apparatus may include a plurality of preview regions, where each preview region displays a preview picture captured by one of the cameras.

Optionally, the plurality of preview regions may be a plurality of viewfinder frames in the shooting interface. For example, the plurality of viewfinder frames may include at least one first viewfinder frame and at least one second viewfinder frame, where the first viewfinder frame is a main viewfinder frame and the second viewfinder frame is a floating viewfinder frame.

For example, a display form of the viewfinder frame includes either of the following: full-screen display and floating display. For example, the main viewfinder frame can be displayed in full screen, and the floating viewfinder frame can be displayed in the shooting interface in a floating manner.

For example, the shooting apparatus may also dynamically switch between the plurality of viewfinder frames based on actual preview requirements of the user. For example, after the user double-taps the main viewfinder frame, the shooting apparatus may switch from the main viewfinder frame to the floating viewfinder frame, or after the user double-taps the floating viewfinder frame, the shooting apparatus may display the floating viewfinder frame in full screen.

It should be noted that in a case that switching of the viewfinder frame is performed, the preview picture in the viewfinder frame may be unchanged, that is, what may be changed by the switching of the viewfinder frame is the position in which the preview picture is displayed.

Optionally, in this embodiment of this application, the first camera may be a rear-facing camera or a front-facing camera in the electronic device.

For example, the first camera and the second camera may include the following four possible combinations:
(1) The first camera is a rear-facing camera, and the second camera is a front-facing camera.
(2) The first camera is a front-facing camera, and the second camera is a rear-facing camera.
(3) Both the first camera and the second camera are front-facing cameras.
(4) Both the first camera and the second camera are rear-facing cameras.

It should be noted that the shooting method provided in this embodiment of this application is hereinafter described in detail by using the form of the first combination as an example.

Optionally, in this embodiment of this application, the shooting apparatus may determine the target parameter of the second camera based on the first preview picture captured by the first camera, and adjust the current target parameter of the second camera based on the target parameter. For example, the target parameter includes at least one of the following: the shooting position or the focal length.

Step 102: Capture a first image through the first camera, and capture a second image through a adjusted second camera.

Optionally, in this embodiment of this application, after receiving a first input from the user, the shooting apparatus may control the first camera to capture the first image, and control the second camera to capture the second image.

For example, the first input is used to trigger the shooting apparatus to perform a shooting (that is, image capture) operation. For example, the first input may include at least one of the following: a touch input in the shooting interface by the user or other feasible inputs. This is not limited in this embodiment of this application.

For example, the first image and the second image may be captured simultaneously or sequentially. An order of capturing images by the cameras is not limited in this embodiment of this application. For example, the shooting apparatus may control the first camera and the second camera to perform shooting simultaneously, or the shooting apparatus may first control the first camera to capture the first image, and after a predetermined condition is satisfied, control the second camera to capture the second image. For example, the predetermined condition may include either of the following: the first image has been captured, and predetermined duration (for example, 1s) elapses after the first camera captures the first image.

Step 103: Obtain a target image based on the first image and the second image.

It may be understood that the target image includes first image content of the first image and second image content of the second image. For example, the first image content may be all or a part of the image content of the first image, and the second image content may also be all or a part of the image content of the second image. For example, the target image may include portrait and background content of the first image and include portrait content of the second image. In this way, when a photographer takes a photo of a photographed object through the rear-facing camera, a group photo including a portrait of the photographer and the photographed object photographed by the rear-facing camera may be obtained.

Optionally, in this embodiment of this application, the shooting apparatus may recognize and extract a target image region from the second image, and then composite the target image region into the first image to generate the target image. For example, the target image region may be a portrait region.

Optionally, in this embodiment of this application, the shooting apparatus may composite the target image region into a combining position of the first image based on a combining position of the target image region in the second image, to generate the target image.

For example, the combining position may be determined by at least one of the following: a position selected by the user from the preview picture of the first camera, or a position automatically determined by the shooting apparatus based on the captured preview picture.

In the shooting method provided in this embodiment of this application, when the electronic device captures images of photographed objects through a plurality of cameras, in the case that the preview picture captured by the first camera is displayed, the electronic device may adjust the shooting position and/or the focal length of the second camera based on the preview picture, capture images through the first camera and the second camera after the parameter adjustment, and then obtain the target image based on the images captured by the first camera and the second camera. Therefore, the electronic device can flexibly adjust the shooting parameter of the second camera based on the preview picture captured by the first camera. In this way, shooting angles of the first camera and the second camera are coordinated, objects photographed by the two cameras are consistent in size and integrity, and shooting effects are improved.

Optionally, in this embodiment of this application, the second camera is a movable camera. For example, the second camera may be an under-display camera. The target parameter includes the shooting position.

For example, the process of adjusting a target parameter of a second camera based on the preview picture in step 101 may include the following step 101*a* and step 101*b*.

Step 101*a*: Determine a first angle based on the first preview picture.

Step 101*b*: Determine a first target position based on the first angle, and move the second camera to the first target position.

In a case that the second camera is located in the first target position, a second angle matches the first angle.

Optionally, the first angle is an included angle between a first reference line and a plane on which the electronic device is located, and a value range of the first angle is from 0° to 90°. The first reference line is a connection line between a position of the first camera and a position of a first photographed object.

For example, the position of the first camera is a position in which the first camera is located in the electronic device, or the position of the first camera is a screen position or region directly above the position in which the camera is located. For example, the position in which the camera is located in the electronic device is in a one-to-one correspondence with the screen position corresponding to the camera, that is, the screen position corresponding to the camera may be used to represent the position in which the camera is located in the electronic device.

Optionally, the first photographed object may be determined based on a second position selected by the user from the first preview picture, and the first photographed object corresponds to the second position in the first preview picture captured by the first camera.

For example, if the first preview picture of the first camera includes a portrait 1, a portrait 2, and a portrait 3, the second position may be a position of a center point of a face of the portrait 1 in the first preview picture, and a face of a person 1 corresponding to the portrait 1 is determined as the first photographed object.

It can be understood that the second position may alternatively be a position between the portrait 1 and the portrait 2 in the first preview picture. In this case, both the person 1 corresponding to the portrait 1 and a person 2 corresponding to the portrait 2 are determined as the first photographed object. In this case, a connection line between the position of the first camera and the position of the first photographed object may be considered as a connection line between the position of the first camera and a position (a relationship between the position and the person 1 and the person 2 is the same as a relationship between the second position and the portrait 1 and the portrait 2) between the person 1 and the person 2.

It may be understood that the position of the first photographed object is a position corresponding to the second position in the preview picture, in a spatial coordinate system. For example, the position of the first photographed object may be represented by spatial coordinates.

Figure 2:
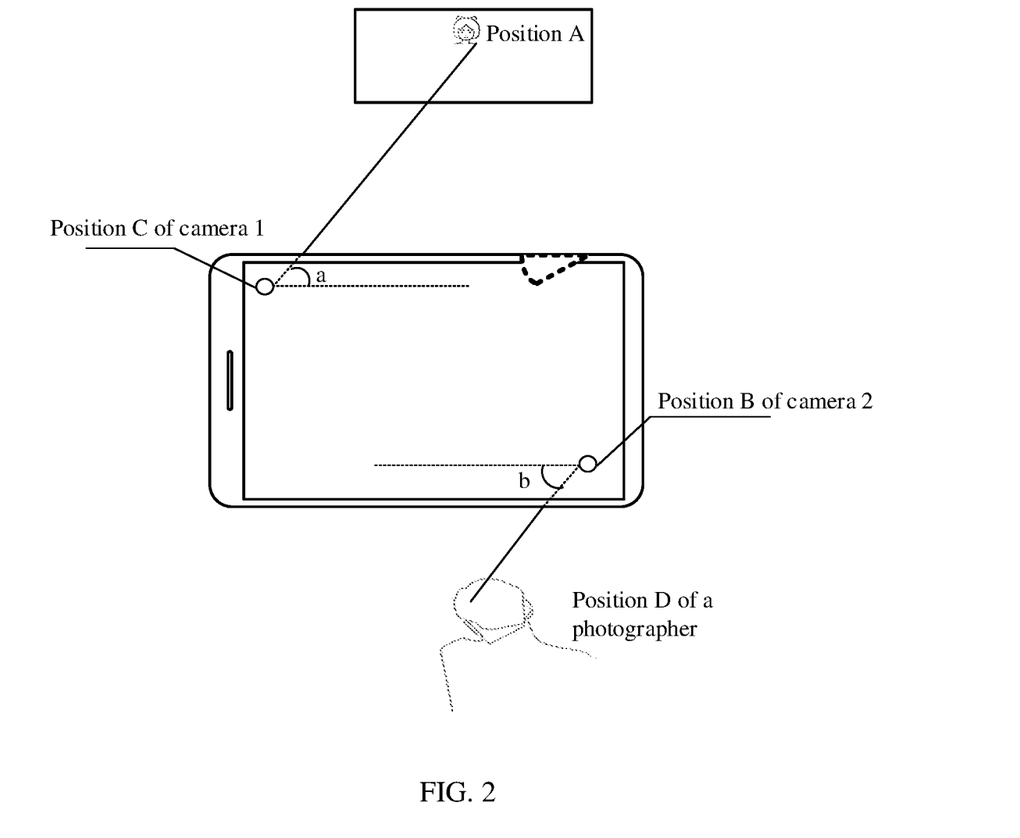
FIG. 2 is a first schematic diagram of a shooting preview screen according to an embodiment of this application.

As shown in FIG. 2, in a case that a preview picture of a group portrait captured by a camera 1 is displayed, after the user taps a position P (that is, the second position) in the preview picture, the shooting apparatus may determine, based on a position of the position P in a preview interface, a position A (that is, the position of the first photographed object) corresponding to the position P in space in which the group portrait corresponding to the preview interface is located.

It may be understood that the shooting apparatus determines a connection line between the position of the first photographed object and the position of the first camera based on the position of the first photographed object and the position of the first camera, and then obtains a value of an angle between the connection line and a plane on which a display of the electronic device is located, thereby determining a value of the first angle. For example, the shooting apparatus determines, based on the first angle, the first target position to which the second camera needs to be moved.

Optionally, the first target position includes either of the following: a position under the screen of the electronic device and a position in the screen of the electronic device.

For example, the first target position may be represented by coordinates, and for example, the first target position may be determined by establishing a corresponding coordinate system.

It should be noted that the first target position is a position to which the second camera can be moved. For example, the second camera 1 is an under-display camera, and the shooting apparatus may control the second camera 1 to move from a position 2 under the screen to a position 3 (that is, a position under the screen of the electronic device). In this case, there is a screen position 4 (that is, a position in the screen of the electronic device) corresponding to the position 3, and both the position 3 and the position 4 may be used as the first target position.

For example, after the first target position is determined, the shooting apparatus may control the second camera to move to the first target position with a predetermined track. For example, a moving track along which the shooting apparatus controls the second camera to move is not limited, and may be any moving track that can be implemented. For example, the moving track may be an arc or a straight line.

Optionally, in this embodiment of this application, the second angle is an included angle between a second reference line and the plane on which the electronic device is located, and the second reference line is a connection line between a position of the second camera and a position of a second photographed object.

Optionally, before the process of determining a first target position based on the first angle in step 101*b*, the shooting method provided in this embodiment of this application further includes the following step A1.

Step A1: Determine the second angle based on a second preview picture captured by the second camera.

With reference to step A1, step 101*b* may include the following step 101*b*1.

Step 101*b*1: Determine the first target position based on the first angle and the second angle.

For example, the position of the second camera is a position in which the second camera is located in the electronic device, or the position of the second camera is a screen position or region directly above the position in which the camera is located. For example, the position in which the camera is located in the electronic device is in a one-to-one correspondence with the screen position corresponding to the camera, that is, the screen position corresponding to the camera may be used to represent the position in which the camera is located in the electronic device.

For example, the position of the second photographed object is an actual position of the second photographed object (that is, the photographer) in the spatial coordinate system. For example, the position of the second photographed object may be determined by a position of a reference point on the second photographed object. The reference point may be determined automatically by the electronic device or determined based on a selection input by the user into the preview picture of the second camera.

Optionally, in a process of capturing a picture of the second photographed object through the second camera, the shooting apparatus may obtain the position of the second photographed object, determine a connection line between the position of the second photographed object and the position of the second camera, and then obtain a value of an angle between the connection line and the plane on which the display of the electronic device is located, to determine a value of the second angle.

Optionally, the shooting apparatus may obtain position information of the first target position based on the first angle and the second angle.

For example, in a case that the second camera is located in the first target position, the second angle matches the first angle. For example, that the second angle matches the first angle may include either of the following: that the second angle is equal to the first angle, and that a difference between the second angle and the first angle falls within a predetermined range. For example, the predetermined range may be 0° to 5°.

It should be noted that in a case of determining the values of the first angle and the second angle, the shooting apparatus may control the second camera to move under the screen, so that the first angle matches the second angle.

It may be understood that when the first angle matches the second angle, it can be considered that a viewing angle at which the second camera captures an image is basically the same as a viewing angle at which the first camera captures an image, that is, the two obtained images are basically consistent in a face orientation and a direction of a line of sight.

It should be noted that, in a case that the user obtains images through both the front-facing camera and the rear-facing camera, the shooting apparatus may obtain a position relationship between the rear photographed object and the rear-facing camera, and based on the position relationship, control the front-facing camera to move, so that a position relationship between the front-facing camera and the photographer matches the position relationship between the rear-facing camera and the rear photographed object.

For example, the camera 1 is a rear-facing camera and the camera 2 is an under-display camera. After the user taps the position P in the preview picture of the rear-facing camera, the shooting apparatus obtains a connection line between the first photographed object (position A) corresponding to the position P and the camera 1 (position C), where an angle a (that is, the first angle) between the connection line and the plane (the plane on which the screen is located) on which the electronic device is located is 30°, and the shooting apparatus obtains a connection line between the camera 2 and a position D of the second photographed object (photographer), where an angle b (that is, the second angle) between the connection line and the plane (the plane on which the screen is located) on which the electronic device is located is 60°. A target position B may be determined based on the two angles. Then the shooting apparatus can move the camera 2 to the position B. After the camera 2 is moved, as shown in FIG. 2, when the camera 2 is moved to the position B, the angle b matches the angle a, that is, the angle b is also 300.

Optionally, in this embodiment of this application, before the adjusting a target parameter of a second camera based on the first preview picture in step 101, the shooting method provided in this embodiment of this application further includes the following step C1.

Step C1: Display a second preview picture captured by the second camera.

For example, with reference to step C1, the process of adjusting a target parameter of a second camera based on the first preview picture in step 101 may include the following step 101c1 or step 101c2.

Step 101c1: In a case that a second object in the second preview picture does not match a first object in the first preview picture, move the second camera to a second target position.

Step 101c2: In a case that a second object in the second preview picture does not match a first object in the first preview picture, adjust the focal length of the second camera.

Optionally, the first object and the second object may be objects included in the preview pictures. For example, the first object is an image in the preview picture corresponding to the photographed object. The first object may include at least one of the following: a portrait (person), a building, a natural scene (for example, a tree), or the like. This is not limited in this embodiment of this application. It should be noted that the first object and the second object are not photographed objects, but images in the preview pictures, and that the photographed object is a person, an object, or the like.

For example, the first object may be determined based on a user input in the preview picture of the first camera. For example, in a case that the preview picture includes the portrait 1, the portrait 2, and the portrait 3, after the user taps a region in which the portrait 2 is located, the shooting apparatus may determine the portrait 2 as the first object.

Optionally, that the second object in the second preview picture does not match the first object in the first preview picture may include at least one of the following: that an object region included in the second object is inconsistent with an object region included in the first object; that integrity of the second object is inconsistent with integrity of the first object; that a size of the second object is different from a size of the first object; or that an angle of the second object is different from an angle of the first object. For example, the shooting apparatus may recognize the first object in the preview picture and obtain the size of the first object. For example, the shooting apparatus may determine a focal length value based on a difference between the size of the first object and the size of the second object, and adjust the focal length of the second camera based on the focal length value. For example, the second object is an object in the preview picture captured by the second camera.

In one example, in a case that the first object does not match the second object (for example, the sizes of the objects are inconsistent), the shooting apparatus may adjust the camera to the second target position based on a size relationship between the first object and the second object, thereby shooting an image to obtain the second image, where an object in the image shot at the adjusted position matches the first object.

In another example, in the process of moving the second camera to the second target position, the shooting apparatus may continuously capture images, thereby generating the second image.

It may be understood that the mismatch between the first object and the second object may be a large difference between the first object and the second object in size, or may be a large difference between the first object and the second object in integrity in a case that both the first object and the second object indicate persons. For example, the first object is displayed as a face image and the second object is displayed as a full-body image.

Optionally, after determining the first object, the shooting apparatus may display an adjustment interface, where the adjustment interface includes at least a preview picture region corresponding to the first object, a preview picture captured by the second camera, and a first control. The first control is used to prompt whether to adjust the focal length. For example, the first control may include a "confirm" option (for example, indicated by √) and a "return" option (for example, indicated by x), where the "confirm" option is used to confirm the adjustment of the focal length, and the "return" option is used to return to the adjustment interface.

It should be noted that after the adjustment of the focal length of the second camera is completed, a specification of the object in the image captured by the second camera is the same as or similar to a specification of the object in the image captured by the first camera.

Figure 3:
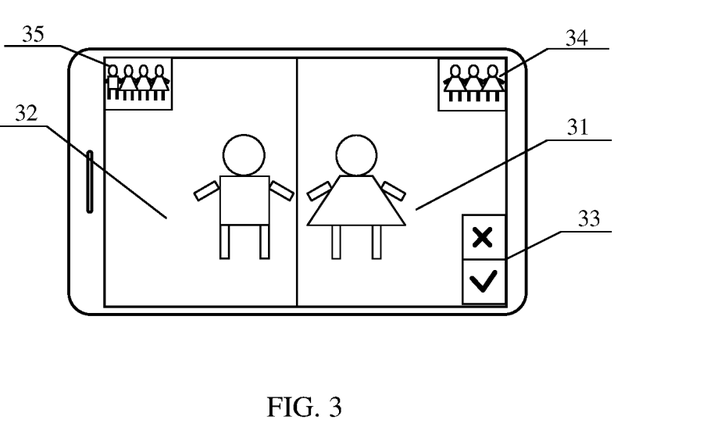
FIG. 3 is a second schematic diagram of a shooting preview screen according to an embodiment of this application.

For example, as shown in FIG. 3, the first camera is a rear-facing camera and the second camera is a front-facing camera. An adjustment interface 30 displays a picture region 31 of the preview picture captured by the rear-facing camera and a preview picture 32 captured by the front-facing camera. After the user taps a "√" in a control 33, the shooting apparatus adjusts the focal length of the front-facing camera, so that a specification of a portrait in a photo shot by the front-facing camera is consistent with a specification of a portrait in a photo shot by the rear-facing camera. In addition, the shooting apparatus further displays a compositing effect preview picture 34 and a preview picture 35 captured by the rear-facing camera, so that the user views a real-time preview picture.

Optionally, in this embodiment of this application, in a case that the adjusting a target parameter of a second camera is moving the second camera to a second target position, the process of capturing a second image through a adjusted second camera in step 102 may include the following step 102a and step 102b.

Step 102a: During the movement of the second camera, capture images of a photographed object corresponding to the second object, to obtain a plurality of images captured at shooting positions.

Step 102b: Composite the plurality of captured images to obtain the second image.

The second target position may include either of the following: a preset position, or a position determined based on the plurality of images.

Optionally, the shooting apparatus may determine, in the shooting process, whether the first object matches the second object, and in a case of mismatch, control the camera to move and scan; or after adjusting the focal length, determine whether the second object matches the first object, and in a case of mismatch, control the front-facing camera to move and scan.

Optionally, when moving the second camera to the second target position, the shooting apparatus may implement the movement in the following two manners.
Manner 1:
Determine, based on the size relationship between the first object and the second object, a position to which the second camera needs to be moved, and determine the position as the second target position; and then control the camera to move, and capture images during the movement of the camera until the second camera is moved to the second target position.
Manner 2:
First control the second camera to move, and capture images during the movement; and then determine the second target position based on captured images, move the camera, and in a case that the camera is moved to the second target position, stop moving the camera. For example, the shooting apparatus may determine in real time in the process of moving the second camera, whether integrity of the object in the image obtained by compositing the plurality of captured images matches integrity of the first object, and in a case of match, determine that the current position is the second target position and stop moving the second camera, or in a case of mismatch, continue to control the second camera to move.

It should be noted that when the first camera is a rear-facing camera and the second camera is a front-facing camera, in a case that the rear-facing camera shoots a group portrait, if it is impossible to accomplish human body framing within a consistent range with the rear-facing camera (usually the rear-facing camera can take a full-body photo of a photographed object) due to a status of the front-facing camera, after the picture of the front-facing camera is adjusted to a suitable size ratio (that is, the focal length is adjusted), if a framing effect cannot meet a requirement for taking a group photo of the two, the second camera may be controlled to move from top to bottom and scan, and then after a relatively complete full-body composite image is obtained, images captured by the first camera and the second camera are composited.

Optionally, after compositing the plurality of images shot by the second camera at various positions, the shooting apparatus may perform at least one of the following processing operations on the composite image: adjusting an image size, adjusting a background color, or the like.

For example, the shooting apparatus may compare the composite image with the first image shot by the first camera in terms of size, angle, and the like, and if there is a difference between the two, adjust the composite image to a target size, for example, adjust the composite image to a size of a full-body portrait in the first image. In this way, a shooting angle of the second camera can be increased, so that a relatively complete image of the photographed object (for example, a full-body image of a person) is obtained, and that an effect of the composite image is improved.

Optionally, in this embodiment of this application, in the case that the preview picture captured by the first camera is displayed, the shooting apparatus may display the preview picture captured by the second camera and display a compositing effect preview picture in real time, where the compositing effect preview picture is used to display an effect drawing after the first image and the second image are composited. For example, the compositing effect preview picture includes the preview picture captured by the first camera, and a target object in the preview picture captured by the second camera.

For example, in a case that the compositing effect preview picture is displayed, the compositing effect preview picture may be displayed in full screen on the shooting interface, and the preview picture captured by the first camera and the preview picture captured by the second camera may be displayed in two floating viewfinder frames respectively.

For example, the shooting apparatus may start displaying the compositing effect preview picture after the first shooting position is determined, and in the case that the compositing effect preview picture is displayed, switch from a main viewfinder frame in which the preview picture of the rear-facing camera is displayed to a floating viewfinder frame.

For example, after the shooting apparatus is started, the preview picture of the rear-facing camera is displayed in the main viewfinder frame by default, and after the user taps to perform a selection input in the preview picture (that is, to determine a to-be-determined position in the preview picture), the preview picture of the front-facing camera is displayed in the floating viewfinder frame. In this way, the shooting apparatus switches from the main viewfinder frame to the floating viewfinder frame, and displays the compositing effect preview picture in full screen, so that the user can view the compositing effect in real time.

Figure 4:
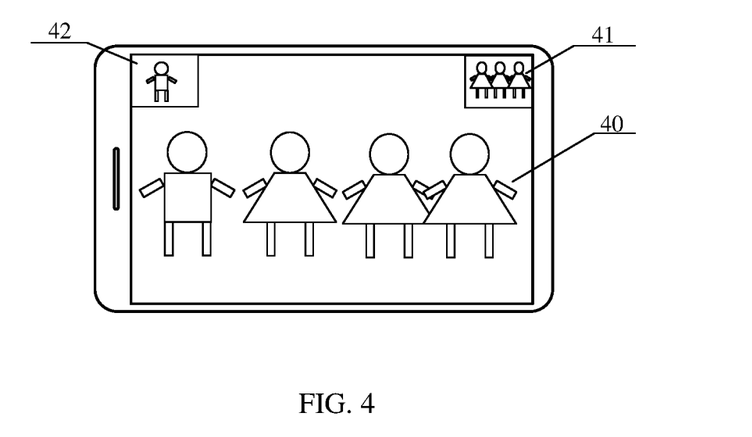
FIG. 4 is a third schematic diagram of a shooting preview screen according to an embodiment of this application.

For example, the first camera is a front-facing camera, and the second camera is a rear-facing camera. As shown in FIG. 4, the shooting apparatus may display a compositing effect preview picture 40 in the entire display region of the display screen, and display a viewfinder frame 41 and a viewfinder frame 42 in a floating manner, where the viewfinder frame 41 displays the preview picture of the rear-facing camera, and the viewfinder frame 42 displays the preview picture of the front-facing camera. In this way, in a case that the shooting apparatus captures the preview picture through the camera, it is convenient for the user to view the compositing effect of the current image, and a man-machine interaction effect is improved.

It should be noted that the shooting method provided in the embodiments of this application may be performed by the shooting apparatus, or a control module configured to perform the shooting method in the shooting apparatus. In the embodiments of this application, assuming that the shooting apparatus performs the shooting method, the shooting apparatus provided in the embodiments of this application is described.

Figure 5:
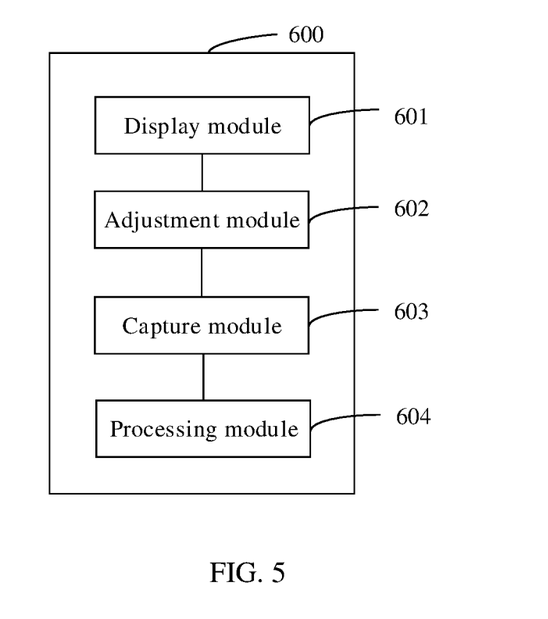
FIG. 5 is a schematic diagram of a structure of a shooting apparatus according to an embodiment of this application.

FIG. 5 is a first schematic diagram of a structure of a shooting apparatus according to an embodiment of this application. As shown in FIG. 5, the shooting apparatus 600 includes a display module 601, an adjustment module 602, a capture module 603, and a processing module 604. In a case that the display module 601 displays a first preview picture captured by a first camera, the adjustment module 602 is configured to adjust a target parameter of a second camera based on the first preview picture, where the target parameter includes at least one of the following: a shooting position or a focal length. The capture module 603 is configured to capture a first image through the first camera, and capture a second image through a second camera adjusted by the adjustment module 602. The processing module 604 is configured to obtain a target image based on the first image and the second image captured by the capture module 603.

Optionally, in this embodiment of this application, the second camera is a movable camera, and the target parameter includes the shooting position; the adjustment module 602 is configured to determine a first angle based on the first preview picture displayed by the display module 601, where the first angle is an included angle between a first reference line and a plane on which an electronic device is located, and the first reference line is a connection line between a position of the first camera and a position of a first photographed object; and the adjustment module 602 is configured to determine a first target position based on the first angle, and move the second camera to the first target position, where in a case that the second camera is located in the first target position, a second angle matches the first angle.

Optionally, in this embodiment of this application, the second angle is an included angle between a second reference line and the plane on which the electronic device is located, and the second reference line is a connection line between a position of the second camera and a position of a second photographed object.

Optionally, in this embodiment of this application, the target parameter includes the focal length;

before the adjustment module 602 adjusts the target parameter of the second camera based on the first preview picture, the display module 601 is further configured to display a second preview picture captured by the second camera; and the adjustment module 602 is configured to move the second camera to a second target position in a case that a second object in the second preview picture does not match a first object in the first preview picture, or configured to adjust the focal length of the second camera in a case that a second object in the second preview picture does not match a first object in the first preview picture.

Optionally, in this embodiment of this application, in a process of moving the second camera by the adjustment module 602, the capture module 603 is configured to capture images of a photographed object corresponding to the second object, to obtain a plurality of images captured at shooting positions; and the processing module 604 is further configured to composite the plurality of images captured by the capture module 603, to obtain the second image.

In the shooting apparatus provided in this embodiment of this application, when the shooting apparatus captures images of photographed objects through a plurality of cameras, in the case that the preview picture captured by the first camera is displayed, the shooting apparatus may adjust the shooting position and/or the focal length of the second camera based on the preview picture, capture images through the first camera and the second camera after the parameter adjustment, and then obtain the target image based on the images captured by the first camera and the second camera. Therefore, the shooting apparatus can flexibly adjust the shooting parameter of the second camera based on the preview picture captured by the first camera. In this way, shooting angles of the first camera and the second camera are coordinated, objects photographed by the two cameras are consistent in size and integrity, and shooting effects are improved.

The shooting apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not limited in this embodiment of this application.

The shooting apparatus in this embodiment of this application may be an apparatus having an operating system. The operating system may be an Android operating system, an iOS operating system, or other possible operating systems, and is not limited in this embodiment of this application.

The shooting apparatus provided in this embodiment of this application is capable of implementing the processes implemented in the method embodiments in FIG. 1 to FIG. 4. To avoid repetition, details are not described herein again.

Figure 6:
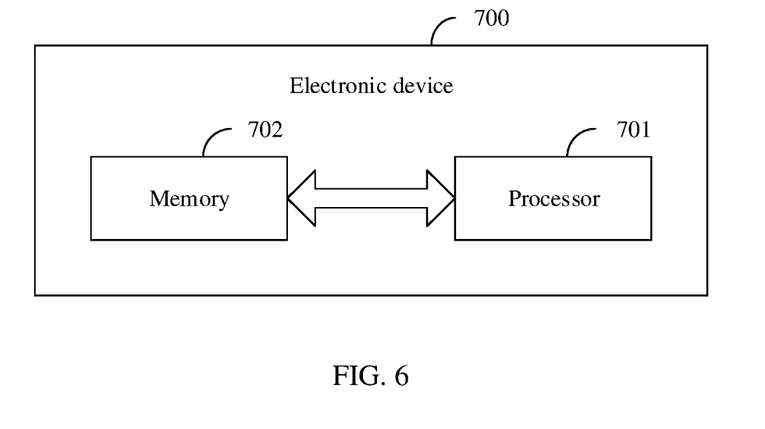
FIG. 6 is a first schematic diagram of hardware of an electronic device according to an embodiment of this application.

Optionally, as shown in FIG. 6, an embodiment of this application further provides an electronic device 700, including a processor 701, a memory 702, and a program or instructions stored in the memory 702 and executable on the processor 701. When the program or instructions are executed by the processor 701, each process of the shooting method embodiment is implemented, with the same technical effect achieved. To avoid repetition, details are not described herein again.

It should be noted that electronic devices in this embodiment of this application include the foregoing mobile electronic device and non-mobile electronic device.

Figure 7:
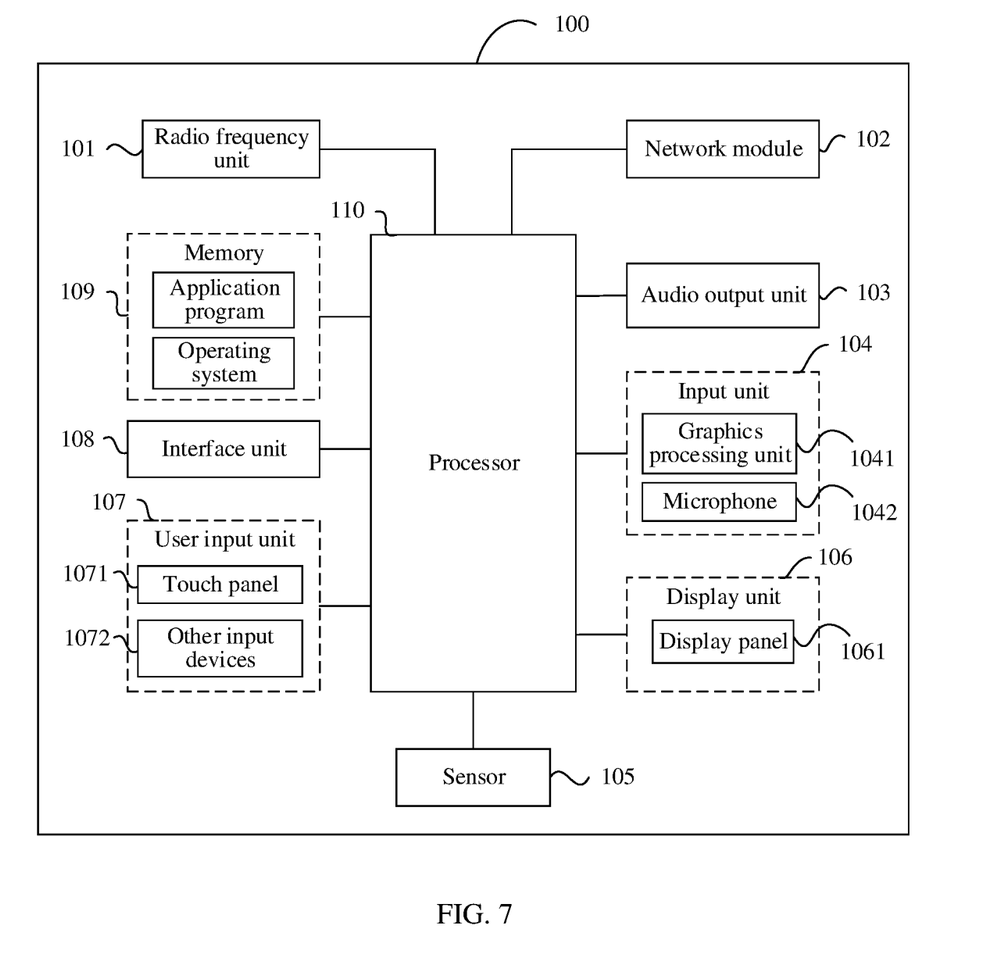
FIG. 7 is a second schematic diagram of hardware of an electronic device according to an embodiment of this application.

FIG. 7 is a schematic diagram of a hardware structure of an electronic device for implementing an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the electronic device 100 may further include a power supply (such as a battery) for supplying power to the components. The power supply may be logically connected to the processor 110 through a power management system. In this way, functions such as charge management, discharge management, and power consumption management are implemented by using the power management system. The structure of the electronic device shown in FIG. 7 does not constitute a limitation on the electronic device. The electronic device may include more or fewer components than those shown in the figure, or some components are combined, or component arrangements are different. Details are not described herein again.

The processor 110 is configured to: in a case that the display unit 106 displays a preview picture captured by a first camera, adjust a target parameter of a second camera based on the first preview picture, where the target parameter includes at least one of the following: a shooting position or a focal length; and capture a first image through the first camera, and capture a second image through a adjusted second camera; and the processor 110 is further configured to obtain a target image based on the first image and the second image.

Optionally, in this embodiment of this application, the second camera is a movable camera, and the target parameter includes the shooting position; the processor 110 is configured to determine a first angle based on the preview picture displayed by the display unit 106, where the first angle is an included angle between a first reference line and a plane on which the electronic device is located, and the first reference line is a connection line between a position of the first camera and a position of a first photographed object; and the processor 110 is configured to determine a first target position based on the first angle, and move the second camera to the first target position, where in a case that the second camera is located in the first target position, a second angle matches the first angle.

Optionally, in this embodiment of this application, the second angle is an included angle between a second reference line and the plane on which the electronic device is located, and the second reference line is a connection line between a position of the second camera and a position of a second photographed object.

Optionally, in this embodiment of this application, the target parameter includes the focal length; before the processor 110 adjusts the target parameter of the second camera based on the first preview picture, the display unit 106 is further configured to display a second preview picture captured by the second camera; and the processor 110 is further configured to move the second camera to a second target position in a case that a second object in the second preview picture captured by the second camera does not match a first object in the first preview picture; or configured to adjust the focal length of the second camera in a case that a second object in the second preview picture does not match a first object in the first preview picture.

Optionally, in this embodiment of this application, in a process of moving the second camera by the processor 110, the processor 110 is configured to capture images of a photographed object corresponding to the second object, to obtain a plurality of images captured at shooting positions; and the processor 110 is further configured to composite the plurality of captured images to obtain the second image.

In the electronic device provided in this embodiment of this application, when the electronic device captures images of photographed objects through a plurality of cameras, in the case that the preview picture captured by the first camera is displayed, the electronic device may adjust the shooting position and/or the focal length of the second camera based on the preview picture, capture images through the first camera and the second camera after the parameter adjustment, and then obtain the target image based on the images captured by the first camera and the second camera. Therefore, the electronic device can flexibly adjust the shooting parameter of the second camera based on the preview picture captured by the first camera. In this way, shooting angles of the first camera and the second camera are coordinated, objects photographed by the two cameras are consistent in size and integrity, and shooting effects are improved.

It should be understood that, in this embodiment of this application, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a switch key), a trackball, a mouse, and a joystick. Details are not described herein again. The memory 109 may be configured to store a software program and various data, including but not limited to an application program and an operating system. The processor 110 may integrate an application processor and a modem processor. The application processor mainly processes the operating system, a user interface, an application program, or the like. The modem processor mainly processes wireless communication. It may be understood that the modem processor may alternatively be not integrated in the processor 110.

An embodiment of this application further provides a non-transitory readable storage medium. The non-transitory readable storage medium stores a program or instructions. When the program or instructions are executed by a processor, each process of the foregoing shooting method embodiment is implemented, with the same technical effect achieved. To avoid repetition, details are not described herein again.

The processor is a processor in the electronic device in the foregoing embodiment. The non-transitory readable storage medium includes a non-transitory computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement each process of the foregoing shooting method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

An embodiment of this application provides a computer program product. The program product is stored in a non-volatile storage medium. The program product is executed by at least one processor to implement each process of the foregoing shooting method embodiment, with the same technical effect achieved.

It should be noted that in this specification, the term "comprise", "include", or any variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for enabling a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A shooting method, wherein the method comprises:
    in a case that a first preview picture captured by a first camera is displayed, adjusting a target parameter of a second camera based on the first preview picture, wherein the target parameter comprises at least one of: a shooting position or a focal length;
    capturing a first image through the first camera, and capturing a second image through a adjusted second camera; and
    obtaining a target image based on the first image and the second image;
    wherein a photographed object captured by the first camera is different from a photographed object captured by the second camera; the second camera is a movable camera, and the target parameter comprises the shooting position; and
    the adjusting the target parameter of the second camera based on the first preview picture comprises:
    determining a first angle based on the first preview picture, wherein the first angle is an included angle between a first reference line and a plane on which an electronic device is located, and the first reference line is a connection line between a position of the first camera and a position of a first photographed object; and
    determining a first target position based on the first angle, and moving the second camera to the first target position, wherein
    in a case that the second camera is located in the first target position, a second angle matches the first angle.

2. The method according to claim 1, wherein
    the second angle is an included angle between a second reference line and the plane on which the electronic device is located, and the second reference line is a connection line between a position of the second camera and a position of a second photographed object.

3. The method according to claim 2, wherein that the second angle matches the first angle comprises: that the second angle is equal to the first angle, or that a difference between the second angle and the first angle falls within a predetermined range.

4. The method according to claim 1, wherein before the adjusting the target parameter of the second camera based on the first preview picture, the method further comprises:
    displaying a second preview picture captured by the second camera; and
    the adjusting the target parameter of the second camera based on the first preview picture comprises:
    in a case that a second object in the second preview picture does not match a first object in the first preview picture, moving the second camera to a second target position; or
    in a case that a second object in the second preview picture does not match a first object in the first preview picture, adjusting the focal length of the second camera.

5. The method according to claim 4, wherein that the second object in the second preview picture does not match the first object in the first preview picture comprises at least one of:

that an object region comprised in the second object is inconsistent with an object region comprised in the first object;

that integrity of the second object is inconsistent with integrity of the first object;

that a size of the second object is different from a size of the first object; or that an angle of the second object is different from an angle of the first object.

6. The method according to claim 4, wherein the moving the second camera to the second target position comprises:

controlling the second camera to move, and capturing images during the movement of the second camera; and determining the second target position based on images captured by the second camera, moving the second camera to the second target position, and in a case that the second camera is moved to the second target position, stopping moving the second camera.

7. The method according to claim 4, wherein in a case that the adjusting the target parameter of the second camera is moving the second camera to the second target position, the capturing the second image through the adjusted second camera comprises:

during a movement of the second camera, capturing images of a photographed object corresponding to the second object, to obtain a plurality of images captured at shooting positions; and compositing the plurality of captured images to obtain the second image.

8. The method according to claim 1, wherein the target image comprises first image content of the first image and second image content of the second image, wherein the first image content comprises all or part of image content of the first image, and the second image content comprises all or part of image content of the second image.

9. The method according to claim 8, wherein in a case that the first image content comprises a portrait and that the second image content comprises a portrait, shooting angles, portrait sizes, and integrity of persons in portraits in the target image are matched.

10. An electronic device, comprising a processor, a memory, and a program or instructions stored in the memory and executable on the processor, wherein the program or instructions, when executed by the processor, cause the electronic device to perform:

in a case that a first preview picture captured by a first camera is displayed, adjusting a target parameter of a second camera based on the first preview picture, wherein the target parameter comprises at least one of: a shooting position or a focal length;

capturing a first image through the first camera, and capturing a second image through a adjusted second camera; and obtaining a target image based on the first image and the second image;

wherein a photographed object captured by the first camera is different from a photographed object captured by the second camera; the second camera is a movable camera, and the target parameter comprises the shooting position; and the program or instructions, when executed by the processor, cause the electronic device to perform:

determining a first angle based on the first preview picture, wherein the first angle is an included angle between a first reference line and a plane on which an electronic device is located, and the first reference line is a connection line between a position of the first camera and a position of a first photographed object; and determining a first target position based on the first angle, and moving the second camera to the first target position, wherein in a case that the second camera is located in the first target position, a second angle matches the first angle.

11. The electronic device according to claim 10, wherein the second angle is an included angle between a second reference line and the plane on which the electronic device is located, and the second reference line is a connection line between a position of the second camera and a position of a second photographed object.

12. The electronic device according to claim 11, wherein that the second angle matches the first angle comprises: that the second angle is equal to the first angle, or that a difference between the second angle and the first angle falls within a predetermined range.

13. The electronic device according to claim 10, wherein the program or instructions, when executed by the processor, cause the electronic device to further perform:

displaying a second preview picture captured by the second camera; and the program or instructions, when executed by the processor, cause the electronic device to perform:

in a case that a second object in the second preview picture does not match a first object in the first preview picture, moving the second camera to a second target position; or in a case that a second object in the second preview picture does not match a first object in the first preview picture, adjusting the focal length of the second camera.

14. The electronic device according to claim 13, wherein that the second object in the second preview picture does not match the first object in the first preview picture comprises at least one of:

that an object region comprised in the second object is inconsistent with an object region comprised in the first object;

that integrity of the second object is inconsistent with integrity of the first object;

that a size of the second object is different from a size of the first object; or that an angle of the second object is different from an angle of the first object.

15. The electronic device according to claim 13, wherein the program or instructions, when executed by the processor, cause the electronic device to perform:

controlling the second camera to move, and capturing images during the movement of the second camera; and determining the second target position based on images captured by the second camera, moving the second camera to the second target position, and in a case that the second camera is moved to the second target position, stopping moving the second camera.

16. The electronic device according to claim 13, wherein in a case that the adjusting a target parameter of a second camera is moving the second camera to a second target position, the program or instructions, when executed by the processor, cause the electronic device to perform:

during a movement of the second camera, capturing images of a photographed object corresponding to the second object, to obtain a plurality of images captured at shooting positions; and compositing the plurality of captured images to obtain the second image.

17. The electronic device according to claim 10, wherein the target image comprises first image content of the first image and second image content of the second image, wherein the first image content comprises all or part of image content of the first image, and the second image content comprises all or part of image content of the second image.

18. A non-transitory computer-readable storage medium, wherein the readable storage medium stores a program or instructions, and the program or instructions, when executed by a processor of an electronic device, cause the electronic device to perform:

in a case that a first preview picture captured by a first camera is displayed, adjusting a target parameter of a second camera based on the first preview picture, wherein the target parameter comprises at least one of: a shooting position or a focal length;

capturing a first image through the first camera, and capturing a second image through a adjusted second camera; and obtaining a target image based on the first image and the second image;

wherein a photographed object captured by the first camera is different from a photographed object captured by the second camera; the second camera is a movable camera, and the target parameter comprises the shooting position; and the program or instructions, when executed by the processor, cause the electronic device to perform:

determining a first angle based on the first preview picture, wherein the first angle is an included angle between a first reference line and a plane on which an electronic device is located, and the first reference line is a connection line between a position of the first camera and a position of a first photographed object; and determining a first target position based on the first angle, and moving the second camera to the first target position, wherein in a case that the second camera is located in the first target position, a second angle matches the first angle.

19. The non-transitory computer-readable storage medium according to claim 18, wherein the second angle is an included angle between a second reference line and the plane on which the electronic device is located, and the second reference line is a connection line between a position of the second camera and a position of a second photographed object.

20. The non-transitory computer-readable storage medium according to claim 19, wherein that the second angle matches the first angle comprises: that the second angle is equal to the first angle, or that a difference between the second angle and the first angle falls within a predetermined range.

* * * * *